(12) United States Patent
Kalsi

(10) Patent No.: US 6,278,212 B1
(45) Date of Patent: Aug. 21, 2001

(54) EXCITER WITH AXIAL GAP

(75) Inventor: Swarn S. Kalsi, Shrewsbury, MA (US)

(73) Assignee: American Superconductor Corp., Westborough, MA (US)

( * ) Notice: Subject to any disclaimer, the term of this patent is extended or adjusted under 35 U.S.C. 154(b) by 0 days.

(21) Appl. No.: 09/349,433

(22) Filed: Jul. 7, 1999

(51) Int. Cl.[7] .................................................. H02K 1/22
(52) U.S. Cl. ...................... 310/162; 310/102 R; 310/184
(58) Field of Search .............................. 310/68 D, 102 R, 310/264, 268, 112, 113, 114, 162, 158, 165; 322/29, 59, 60, 73, 63; 290/46, 38, 52, 40

(56) References Cited

U.S. PATENT DOCUMENTS

| | | | |
|---|---|---|---|
| Re. 35,763 | 4/1998 | Burgbacher | 310/51 |
| 2,356,972 | * 8/1944 | Chubbuck | 310/268 |
| 2,880,335 | * 3/1959 | Dexter | 310/216 |
| 3,219,861 | * 11/1965 | Burr | 310/268 |
| 3,908,161 | 9/1975 | Messenger | 322/29 |
| 4,363,988 | * 12/1982 | Kliman | 310/268 |
| 5,028,830 | * 7/1991 | Mas | 310/211 |
| 5,047,682 | 9/1991 | Burgbacher | 310/361 |
| 5,065,484 | * 11/1991 | Pinchott | 29/596 |
| 5,250,867 | 10/1993 | Gizaw | 310/179 |
| 5,397,953 | * 3/1995 | Cho | 310/254 |
| 5,731,649 | * 3/1998 | Caamano | 310/216 |
| 5,864,198 | * 1/1999 | Pinkerton | 310/266 |
| 6,020,712 | * 2/2000 | Roesel, Jr. et al. | 318/705 |
| 6,066,906 | * 5/2000 | Kalsi | 310/179 |

* cited by examiner

Primary Examiner—Tran Nguyen
(74) Attorney, Agent, or Firm—Fish & Richardson P.C.

(57) ABSTRACT

An exciter includes a concentrically laminated disk with AC windings, and a stationary disk with DC excitation windings and a plurality of DC excitation poles. The stationary disk is spaced from the laminated disk to form a gap therebetween. Upon rotation of the laminated disk, a DC current applied to the DC excitation poles produces an AC current in the AC windings. The AC current passes through a rotating rectifier to produce DC current, which supplies the generator or motor field. The stationary disk also includes pilot AC windings. The DC excitation poles are on a first face of the stationary disk and the AC windings are on a second face of the stationary disk. A rectifier is coupled between the pilot AC windings and the DC excitation windings of the stationary disk. A pilot disk with permanent magnets is spaced from the stationary disk to form a gap therebetween. Upon rotation of the pilot disk, an AC current is created in the pilot AC windings of the stationary disk.

18 Claims, 3 Drawing Sheets

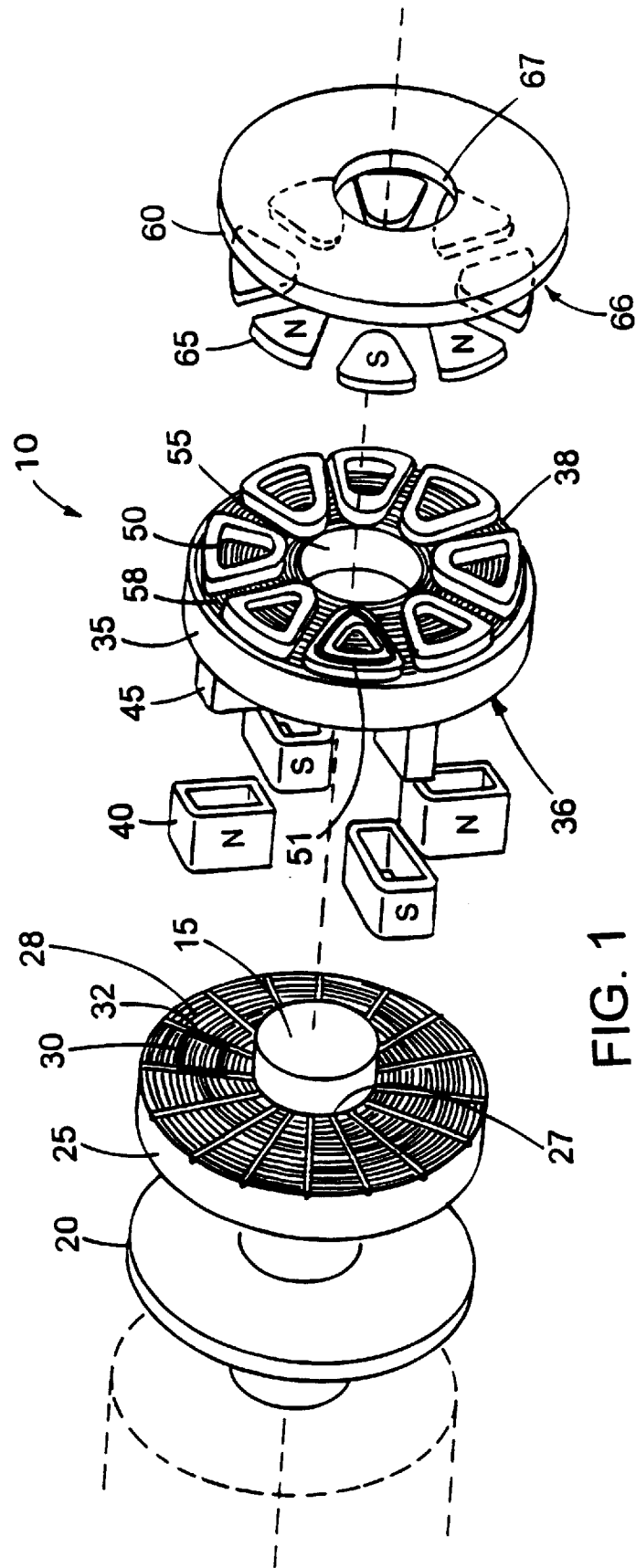

EXCITER WITH AXIAL GAP

BACKGROUND OF THE INVENTION

The invention relates to an exciter with axial gap for providing power to, for example, a synchronous machine such as a motor or generator.

Conventional exciters typically have a concentric rotor and stator for providing high voltage, low current power to a synchronous machine. The size of a conventional exciter is typically about 10% of the machine being powered.

Power to a superconducting synchronous machine is provided at low voltage and high current. Exciter power is typically provided to a superconducting synchronous machine by an exciter having a concentric rotor and stator connected to a shaft extending out of the machine housing.

SUMMARY OF THE INVENTION

The exciter of the present invention has a unique configuration for providing low voltage, high current power to, for example, a superconducting synchronous machine. In addition, the size and configuration of the exciter permits it to be located directly in the machine housing.

According to one aspect of the invention, an exciter includes a concentrically laminated rotatable disk including AC windings, and a stationary disk including a plurality of DC excitation poles with DC excitation windings. The stationary disk is axially spaced from the concentrically laminated disk to form a gap therebetween. Upon rotation of the concentrically laminated disk, a DC current applied to the DC excitation poles produces an AC current in the AC winding.

Embodiments of this aspect of the invention may include one or more of the following features.

A rectifier is coupled to the AC windings of the concentrically laminated disk to produce a DC exciter current. The plurality of DC excitation poles are on a first face of the stationary disk. On a second face of the stationary disk are pilot AC windings. A second rectifier includes an output coupled to the DC windings and an input coupled to pilot AC windings. A current regulator is electrically disposed between the pilot AC windings and the DC windings. The stationary disk, rectifier and current regulator are mounted to a frame.

In certain illustrated embodiments, the exciter includes a pilot disk including permanent magnets. The pilot disk is spaced from the second face of the stationary disk to form a gap therebetween. Upon rotation of the pilot disk, an AC current is created in the pilot AC windings.

The pilot disk and the concentrically laminated disk are mounted to a shaft for rotation therewith. The stationary disk is also concentrically laminated.

According to another aspect of the invention, a synchronous machine includes a stator, a rotor, and a disk-shaped exciter electrically coupled to the rotor. The disk-shaped exciter has a concentrically laminated rotatable disk including AC windings and a stationary disk including a plurality of DC poles with DC excitation windings. Upon rotation of the concentrically laminated disk, a DC current applied to the DC excitation windings produces an AC current in the AC windings.

According to another aspect of the invention, an exciter for a synchronous machine includes a stationary disk with a plurality of DC excitation poles with DC excitation windings on a first face of the disk and pilot AC windings on a second face of the disk. A rectifier is coupled between the pilot AC windings and the DC excitation windings.

According to another aspect of the invention, a housing encloses a superconducting machine and a disk-shaped exciter. The superconducting machine has cooled superconducting windings. The disk-shaped exciter is sized to fit within the superconducting machine housing. For a small machine of, for example, 5000 hp, the ratio of the overall length of the superconducting machine to the overall length of the disk-shaped exciter is at least about 4:1. For larger machines, the ratio will typically be about 10:1.

According to another aspect of the invention, the disk-shaped exciter for a synchronous machine includes a brushless pilot exciter including permanent magnets mounted in relative rotation with respect to a second face of a disk having concentric laminations and including a plurality of DC excitation poles on a first face of the disk and AC windings on the second face of the disk.

In another aspect, the invention features a method for providing an exciter current. The method includes providing power to a plurality of DC excitation windings on a first face of a stationary disk, and rotating a concentrically laminated disk axially spaced from the stationary disk at a fixed distance. The concentrically laminated disk including AC windings facing the DC excitation windings such that an AC voltage is produced in the AC windings upon relative rotational movement of the disks.

Embodiments of this aspect of the invention may include one or more of the following features.

The method for providing an exciter current includes rotating a pilot disk including permanent magnets spaced from a second face of the stationary disk by a fixed second distance. The second face of the stationary disk includes pilot AC windings and the rotation of the pilot disk produces a pilot AC current in the pilot AC windings. The pilot AC current is rectified to produce a DC current for powering the DC excitation poles. The method includes rotating the concentrically laminated disk and the pilot disk at the same rate. The concentrically laminated disk and the pilot disk are connected by a shaft.

According to another aspect of the invention, a method for providing an exciter current includes rotating the pilot disk and the concentrically laminated disk at different rates.

According to another aspect of the invention, a method for providing an exciter current includes connecting a first concentrically laminated disk having AC windings to a second disk having permanent magnets such that the first and second disks rotate at the same rate; disposing in between the first and second disks, a plurality of stationary DC excitation poles facing the first disk and stationary pilot AC windings facing the second disk, such that the DC excitation poles are spaced apart from the AC windings by a first fixed distance, and the stationary pilot AC windings are spaced apart from the permanent magnets by a second fixed distance; rectifying a pilot AC current generated in the pilot AC windings, and providing the rectified current to the DC excitation poles, such that an AC current is generated in the AC windings.

Among other advantages, the exciter is electrically self-contained rendering an external power supply unnecessary. The exciter is brushless, thereby eliminating the need for periodic replacement and maintenance of brushes. The exciter is also significantly more compact than conventional exciters permitting the exciter of the invention to be accommodated in the same housing as the synchronous machine being powered.

BRIEF DESCRIPTION OF THE DRAWINGS

Other objects, features and advantages of the invention will be apparent from the following description taken together with the drawings in which:

FIG. 1 is an exploded view of an exciter according to the invention;

DESCRIPTION OF THE PREFERRED EMBODIMENT

Figure 1A:
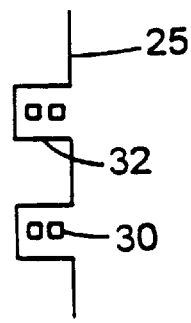
FIG. 1A shows embedded AC windings of the exciter of FIG. 1.
Figure 2:
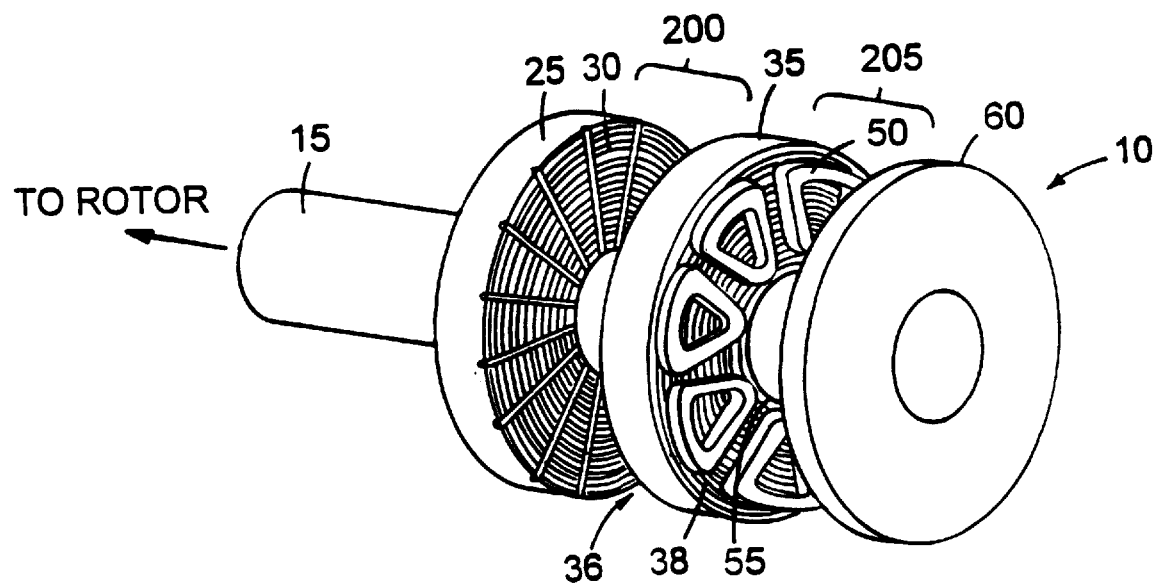
FIG. 2 is an diagrammatic illustration of the exciter of FIG. 1.

Referring to FIGS. 1 and 2, a brushless exciter 10 for supplying a DC exciter current to, for example, a synchronous machine such as a motor or generator, particularly a superconductor motor or generator, includes a rotating disk 25 and a stationary disk 35. It will be appreciated that the arrangement shown in FIGS. 1 and 2 could be modified for use with an exciter with brushes. Stationary disk 35 is spaced from rotating disk 25 to form an axial gap 200 therebetween of, for example, about 1–2 mm. Disk 25 includes AC windings 30, and stationary disk 35 includes a plurality of DC excitation poles 45. When a DC current is applied to DC windings 40, rotation of disk 25 produces an AC voltage in AC windings 30. The AC voltage generates an AC current that is fed into a rectifier 20 to produce the DC exciter current.

A synchronous superconducting machine is powered by low voltage, for example, about 20 Volts. Due to the low voltage requirement, the DC excitation poles 45 can be quite small, for example, about a tenth of the size of conventional exciter poles, enabling the entire exciter assembly to be more compact than conventional exciters.

Figure 3:
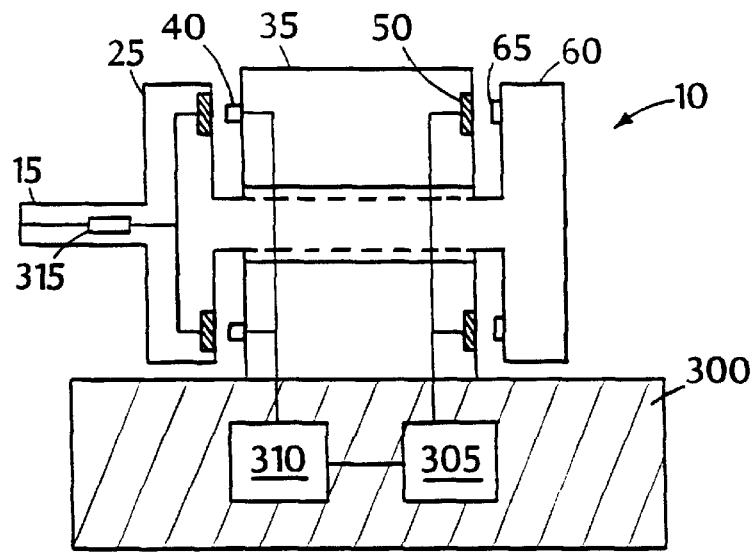
FIG. 3 is a schematic depiction of the exciter of FIG. 1 showing electrical current paths.

The plurality of DC excitation poles 45 are arranged on a first face 36 of stationary disk 35 which faces disk 25. On a second face 38 of stationary disk 35 are pilot AC windings 50. To provide power to DC excitation poles 45, a rotating pilot disk 60 is spaced from stationary disk 35 to form an axial gap 205 therebetween of, for example, about 1–2 mm. Pilot disk 60 includes permanent magnets 65 located on a face 66 of disk 60 which faces second face 38 of disk 35. Rotation of pilot disk 60 induces an AC current in pilot AC windings 50. The rotational torque for pilot disk 60 may be supplied by shaft 15. If shaft 15 connects both pilot disk 60 and rotating disk 25, both disks will rotate at the same rate. The rotational torque for pilot disk 60 may also be supplied from another source, in which case pilot disk 60 may rotate at a different rate than rotating disk 25. Referring to FIG. 3, the AC current from pilot AC windings 50 is fed into a rectifier 305. The rectified current is then fed to a current regulator 310 to produce a regulated DC current for powering DC windings 40.

Referring again to FIGS. 1 and 2, disk 25 defines a central through hole 27 and disk 60 defines a central through hole 67 for receiving a shaft 15. Disks 25 and 60 are mounted to shaft 15 to rotate with shaft 15 by well known techniques such as being keyed or screwed to the shaft. Shaft 15 is, for example, a rotor of a synchronous machine, such machine can be normal or superconducting machines. In preferred embodiments, the rotor includes superconducting windings that are appropriately cooled. Disk 35 defines a central through hole 55 for receiving shaft 15. Hole 55 is sized to provide a clearance fit between disk 35 and shaft 15 such that disk 35 does not rotate with shaft 15. For example, disk 35 is supported by a frame 300 (FIG. 3) using clamps (not shown). Current rectifier 305 and current regulator 310 are located on frame 300. In other embodiments, rectifier 305 and regulator 310 may each be mounted on a control or access panel of machine 430 so that they may be accessed, repaired, or adjusted. The AC output of the exiter is supplied to the main motor through current leads 315. This AC is rectified into DC for consumption of the motor field winding. In yet another embodiment, the DC excitation poles 45 and pilot AC windings 50 are both arranged in a circular pattern on their respective faces of stationary "disk" 35, but "disk" 35 can be other than circular. "Disk" 35 may have a square cross section or have other suitable geometries. "Disk" 35 may also be part of frame 300.

Disk 25 is circular in shape and is constructed using concentric laminations 28 to prevent eddy current losses during operation. Concentric laminations 28 are created by rolling a long strip of iron, preferably about 15 mm thick, upon itself to form a spiral. A bonding material, for example, epoxy, is applied to add structural integrity to concentrically laminated disk 25. Referring also to FIG. 1A, AC windings 30 formed from copper wire coils are embedded in disk 25 via slots 32 cut into the laminations.

Disk 35 is constructed using concentric laminations 58 which act as a magnetic flux carrier for coupling magnetic flux from the permanent magnets to the pilot AC windings. As in disk 25, concentric laminations 58 are created by rolling a long strip of iron, preferably about 15 mm thick, upon itself to form a spiral. DC excitation poles 45 are iron laminations forming salient poles. The laminations include multiple strips of iron stacked along planes perpendicular to face 36 of disk 35. Alternatively, each salient DC pole 45 is constructed of a solid piece of iron.

The DC poles 45 are attached to face 36 of disk 35 by, for example, an epoxy or mechanical means, such as bolts. DC windings 40, also called main exciter coils, are formed from copper wire coils, and are wrapped around laminated DC excitation poles 45. Four DC excitation poles 45 are shown in FIG. 1, however, more or less can be provided. DC current provided to DC windings 40 generates the magnetic fields in the iron laminations forming DC excitation poles 45. DC excitation poles 45 alternate between magnetic north and south and are evenly spaced about face 36 of stationary disk 35. Pilot AC windings 50 formed from copper wire coils are embedded within face 38 of disk 35 using slots 51. In particular applications, pilot AC windings 50 may be mounted on disk 35, instead of embedded within it. Pilot AC windings can be rectangular, square, or any other geometry that provides an area for capturing magnetic flux.

Pilot disk 60 is circular in shape and is formed from soft iron. Permanent magnets 65, eight magnets being shown in FIG. 1, are mounted on face 66 of pilot disk 60 by, for example, epoxy or mechanical means. The arrangement of the permanent magnets on face 66 and the shape of the permanent magnets corresponds to the arrangement and shape of pilot AC windings 50 of face 38 of disk 35.

In applications where an external power source is available, pilot disk 60 and pilot windings 50 may be dispensed with. Referring again to FIG. 3, in such applications, AC line power is fed directly into rectifier 305.

Figure 4:
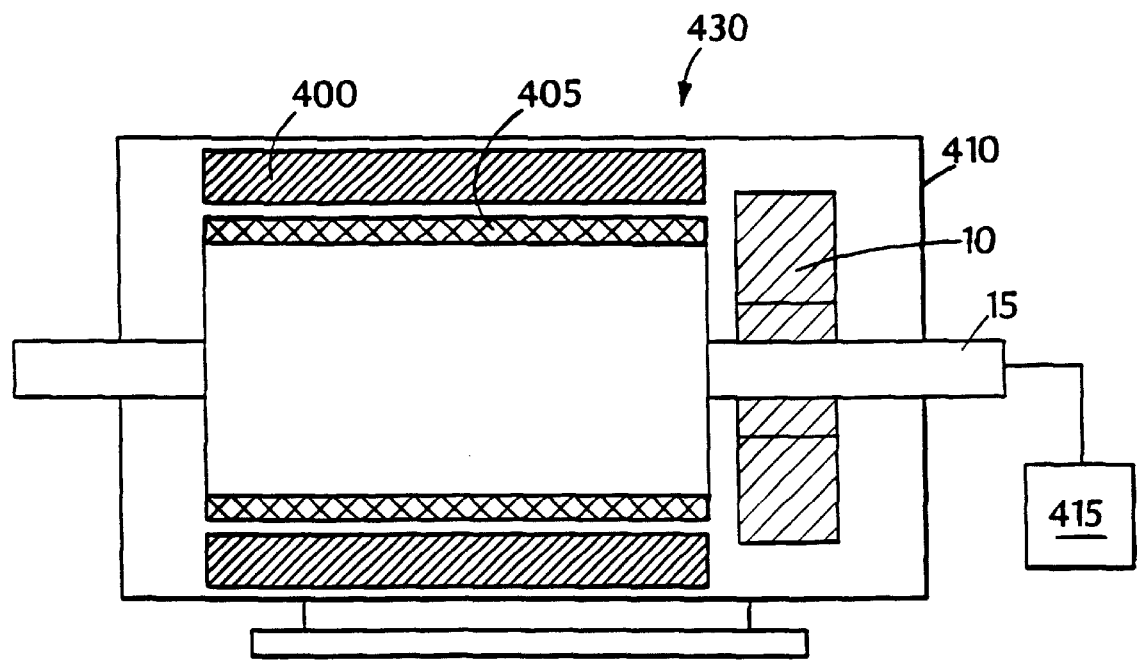
FIG. 4 is a plan view of a machine incorporating the exciter of FIG. 1.

Referring to FIG. 4, a particular application is shown where exciter 10 is used to power a synchronous machine 430, for example, a superconducting machine such as described in Gamble et al., U.S. Pat. No. 5,777,420, entitled "Superconducting Synchronous Motor Construction," the entire contents of which are hereby incorporated by reference.

Machine 430 includes a stator assembly 400 and a rotor assembly 405. Exciter 10 is connected to rotor assembly 405 by shaft 15. Because of the compactness of exciter 10, the exciter can be located entirely within a housing 410 of machine 430.

If rotor assembly 405 of machine for 430 uses superconducting windings, then cooler 415 supplies cold gas to rotor assembly 405 via shaft 15. As mentioned above, rotor assembly 405 may be formed in accordance with the teachings of U.S. Pat. No. 5,777,420. Alternative configurations utilizing low temperature superconductors or high temperature superconductors are within the scope of the invention. In this embodiment, rotor assembly 405 can include superconducting windings formed of a high temperature superconductor (HTS) material such, as for example, a superconducting oxide of the copper oxide family. For example and while not to be construed as limiting, BiSrCaCuO (e.g., $(PbBi)_2Sr_2Ca_2Cu_3O_x$) may be utilized. It will be appreciated that other HTS materials (e.g., YBCO) are within the scope of the present invention. In addition, the superconducting windings may be formed utilizing a pancake coil configuration in accordance with the teachings of U.S. Pat. No. 5,604,473, the entire contents of which are hereby incorporated by reference. Alternative winding configurations are also within the scope of the present scope of the present invention.

When powering, for example, a 5000 hp machine 430 with a length of about 41 inches and a diameter of 32 inches, the overall length of exciter 10 is about 8 inches, and the diameter of each disk is about 28 inches. In this example, housing 410 would be roughly 51 inches in length and 32 inches in diameter. As shown in this example, the ratio of the overall length of the synchronous machine to the overall length of the exciter is at least 4:1.

Other embodiments are within the scope of the following claims.

What is claimed is:

1. An exciter, comprising:
    a concentrically laminated rotatable disk including alternating current windings, and
    a stationary disk including a plurality of direct current excitation poles with direct current excitation windings on a first face of the stationary disk and a plurality of pilot alternating current windings on a second face of the stationary disk, the stationary disk being axially spaced from the concentrically laminated disk to form a gap therebetween, wherein upon rotation of the concentrically laminated disk, a direct current applied to the direct current excitation windings produces an alternating current in the alternating current windings of the rotatable disk.

2. The exciter of claim 1 further comprising a rectifier coupled to the alternating current windings of the rotatable disk.

3. The exciter of claim 1 further comprising a rectifier including an output coupled to the direct current windings and an input coupled to the pilot alternating current windings.

4. The exciter of claim 3 further comprising a current regulator electrically disposed between the pilot alternating current windings and the direct current windings.

5. The exciter of claim 4 further comprising a frame supporting the stationary disk, rectifier and current regulator.

6. The exciter of claim 1 further comprising a pilot disk including permanent magnets, the pilot disk being spaced from the second face of the stationary disk to form a second gap therebetween, wherein upon rotation of the pilot disk, an alternating current is created in the pilot alternating current windings.

7. The exciter of claim 6 wherein the pilot disk and the concentrically laminated disk are mounted to a shaft for rotation therewith.

8. The exciter of claim 1 wherein the stationary disk comprises concentric laminations.

9. A synchronous machine comprising:
    a stator,
    a rotor, and
    a disk-shaped exciter electrically coupled to the rotor, the disk-shaped exciter including:
        a concentrically laminated rotatable disk including alternating current windings, and
        a stationary disk, including a plurality of direct current excitation poles with direct current excitation windings on a first face of the stationary disk and a plurality of pilot alternating current windings on a second face of the stationary disk, the stationary disk being axially spaced from the concentrically laminated disk to form a gap therebetween, wherein upon rotation of the concentrically laminated disk, a direct current applied to the direct current excitation windings produces an alternating current in the alternating current windings.

10. The synchronous machine of claim 9 further comprising
    a pilot disk spaced from the second face of the stationary disk to form a second gap therebetween, wherein upon rotation of the pilot disk, an alternating current is generated in the pilot alternating current windings.

11. The synchronous machine of claim 10 further comprising a rectifier including an output coupled to the direct current windings and an input coupled to the pilot alternating current windings.

12. An exciter for a synchronous machine comprising:
    a disk comprising concentric laminations and including a plurality of direct current excitation poles on a first face of the disk and alternating current windings on a second face of the disk, and
    a rectifier coupled between the alternating current windings and the direct current excitation poles.

13. The exciter of claim 12 further comprising:
    a brushless pilot exciter for producing alternating current in the alternating current windings, the brushless pilot exciter including permanent magnets being mounted for relative rotation with respect to the disk to generate alternating current voltages in the alternating current windings on the second face of the disk.

14. A method for providing an exciter current to a synchronous machine comprising:
    providing power to a plurality of direct current excitation windings on a first face of a stationary disk,
    rotating a concentrically laminated disk, axially spaced from the stationary disk at a fixed distance, the concentrically laminated disk including alternating current windings facing the direct current excitation windings such that an alternating current voltage is produced in the alternating current windings upon the relative rotational movement of the disks, and
    rotating a pilot disk including permanent magnets and spaced from a second face of the stationary disk by a fixed second distance, the second face including pilot alternating current windings and rotation of the pilot disk produces a pilot alternating current in the pilot alternating current windings.

15. The method of claim 14 further comprising rectifying the pilot alternating current for producing a direct current for powering the direct current excitation windings.

16. The method of claim 15 further comprising rotating the concentrically laminated disk and the pilot disk at the same rate.

17. The method of claim 14 further comprising rotating the concentrically laminated disk and the pilot disk at different rates.

18. A method for providing an exciter current comprising:

connecting a first concentrically laminated disk having alternating current windings to a second disk having permanent magnets such that the first and second disks rotate at the same rate, disposing in between the first and second disks, a plurality of stationary direct current excitation poles with direct current excitation windings facing the first disk and stationary pilot alternating current windings facing the second disk, such that the direct current excitation poles are spaced apart from the alternating current windings by a first fixed distance, and the stationary pilot alternating current windings are spaced apart from the permanent magnets by a second fixed distance, rectifying a pilot alternating current generated in the pilot alternating current windings, and providing the rectified current to the direct current excitation windings, such that an alternating current is generated in the alternating current windings.

* * * * *